(12) United States Patent
Steinke et al.

(10) Patent No.: US 7,614,865 B1
(45) Date of Patent: Nov. 10, 2009

(54) METHOD AND APPARATUS FOR FILLING A TIRE AND WHEEL ASSEMBLY WITH A CLOSED CELL POLYURETHANE FOAM

(75) Inventors: Richard A. Steinke, Boulder City, NV (US); Gary N. Benninger, Henderson, NV (US); James G. Moore, Boulder City, NV (US)

(73) Assignee: Amerityre Corporation, Boulder City, NV (US)

( * ) Notice: Subject to any disclaimer, the term of this patent is extended or adjusted under 35 U.S.C. 154(b) by 0 days.

(21) Appl. No.: 12/290,450

(22) Filed: Oct. 31, 2008

(51) Int. Cl.
| | |
|---|---|
| A23G 1/22 | (2006.01) |
| A23G 3/12 | (2006.01) |
| A23G 3/16 | (2006.01) |
| A23P 1/00 | (2006.01) |
| B21C 3/00 | (2006.01) |
| B23B 3/10 | (2006.01) |
| B23B 19/00 | (2006.01) |
| B23B 23/00 | (2006.01) |
| B60C 25/00 | (2006.01) |
| B60C 25/128 | (2006.01) |
| B60C 25/132 | (2006.01) |
| B60C 25/04 | (2006.01) |
| B29C 45/14 | (2006.01) |
| B29C 44/04 | (2006.01) |
| B60C 7/00 | (2006.01) |
| B60C 5/00 | (2006.01) |

(52) U.S. Cl. .................. 425/112; 425/542; 425/589; 425/812; 425/817 R; 425/4 R; 264/267; 264/45.1; 264/DIG. 64; 264/DIG. 77; 152/310; 152/155; 152/157; 157/1.26; 157/1.28; 157/1.3

(58) Field of Classification Search ........................ None
See application file for complete search history.

(56) References Cited

U.S. PATENT DOCUMENTS

| 2,895,519 | A | * | 7/1959 | Coats | 157/14 |
|---|---|---|---|---|---|
| 3,042,090 | A | * | 7/1962 | Foster | 157/20 |
| 3,067,807 | A | * | 12/1962 | Vlasic | 157/1.26 |
| 3,237,676 | A | * | 3/1966 | Wise | 157/1.26 |
| 4,003,419 | A | * | 1/1977 | Verdier | 152/312 |
| 4,027,712 | A | * | 6/1977 | Verdier | 152/311 |
| 4,248,811 | A | * | 2/1981 | Doyle et al. | 264/46.6 |
| 4,738,294 | A | * | 4/1988 | Fosse | 157/1.22 |
| 4,855,096 | A | | 8/1989 | Panaroni | |
| 4,943,223 | A | | 7/1990 | Panaroni | |

(Continued)

FOREIGN PATENT DOCUMENTS

JP 2004174844 A * 6/2004

*Primary Examiner*—Christina Johnson
*Assistant Examiner*—Benjamin Schiffman
(74) *Attorney, Agent, or Firm*—M. Reid Russell

(57) ABSTRACT

An apparatus and method for filling a tire and wheel assembly cavity, that can be a large tire and wheel, with a flexible closed cell polyurethane foam that is passed as a mixture of reacting constituents through a fill hose whose end is fitted between the tire bead and wheel rim, and after filling and removal of the fill hose end, providing for lifting and maintaining the tire bead in engagement with the wheel rim as the reacting materials complete their reaction, uniformly filling the tire and wheel cavity with the flexible closed cell polyurethane foam that has expanded and urges the tire bead into sealing engagement with the wheel rim.

5 Claims, 6 Drawing Sheets

U.S. PATENT DOCUMENTS

| | | | |
|---|---|---|---|
| 5,232,035 A * | 8/1993 | Adams, Jr. ................. | 157/1.17 |
| 5,906,836 A | 5/1999 | Panaroni et al. | |
| 6,165,397 A | 12/2000 | Panaroni et al. | |
| 7,066,724 B2 | 6/2006 | Danules et al. | |
| 7,105,113 B2 | 9/2006 | Danules et al. | |
| 2004/0154718 A1 * | 8/2004 | Doesburg ................... | 152/310 |

* cited by examiner

METHOD AND APPARATUS FOR FILLING A TIRE AND WHEEL ASSEMBLY WITH A CLOSED CELL POLYURETHANE FOAM

BACKGROUND OF INVENTION

1. Field of the Invention

This invention pertains to methods and apparatus for filling the cavity of a tire and wheel with a closed cell polyurethane foam, producing a foam filled tire from a pneumatic tire and wheel that is load supporting.

2. Prior Art

Heretofore, polyurethane foam filled tires have been produced by an injection of a liquid of polyurethane constituents into a mold during mold spinning, forming a foam filled tire. The owner by assignment of the present invention is owner of a number of U.S. Pat. Nos. 4,855,096; 4,943,223; 5,906,836 and 6,165,397, that disclose foam filled tires manufactured by spin casting methods. In which spinning processed the tire outer surface and closed cell foam interior are formed in a single casting operation, providing a tire with a slick outer surface and a closed cell interior.

Another tire fill method has involved filling a rubber tire mounted on a wheel through the tire stem with a mixture of polyurethane constituents that then react within the tire, providing a tire fill that is very dense. There are, of course, other tire fill arrangements that provide for introduction of materials into a tire for flat-proofing a tire. Such uses involve introduction of a sealing material into a tire that has a puncture, and pressurizing the tire to cause the sealing material to flow into the puncture and harden, sealing the puncture.

Recent U.S. Pat. Nos. 7,066,724 and 7,105,113 issued to Danules, et al., show an apparatus and method, respectively, for filling a tire with a light weight polyurethane foam, providing flat-proof tire. The Danules, et al. patents provide apparatus and method for its use where polyurethane reactive materials are mixed in a static mixer and a nucleating gas is separately supplied into the mixed reactant materials. The mixture of reactant materials and nucleating gas are passed into a tire mounted to a wheel assembly through the valve stem or through a hole cut into the casting wall at the valve stem. The introduced reactant materials continue to react in the tire and wheel cavity, producing a foam that fills the tire and wheel assembly.

Distinct from the Danules patents, the present invention employs polyurethane reactive materials that, when mixed, produce, as a product of the reaction, a nucleating gas, and provide for passing the reacting mixed materials into the tire though a fill hose whose end is fitted between the tire side wall bead end and a wheel rim whereon the tire is mounted. In practice, a side of the tire and wheel is positioned flat on a table and the fill hose end is fitted between and across the tire bead and rim. As needed, the fill hose can be moved around the wheel hub during filling for uniformly filling the tire and wheel cavity. The preferred reactant materials for practicing the invention are selected to produce a close cell flexible foam that uniformly fills the tire and wheel assembly cavity.

Additionally, unique to the invention, where the size and weight of a tire and wheel have heretofore restricted, such as in a practice of the Danules patents that are directed to passenger car tires and wheels that have a relatively small cavity volume, the utilization by the process of the invention of multi-point injection of reactant materials around hub provides for rapidly filling even a tire having a large interior volume. In which practice of filling a tire that has a large interior volume, the volume of reactant materials are carefully selected and passed through the fill hose to rapidly fill of the tire and wheel cavity while the reaction process of the reactant materials is still proceeding. After a completion of the filling process, and removal of the discharge hose from between the tire side wall end and wheel rim, the invention provides a tire bead lifter that is operated to lift the tire bead into sealing engagement to the wheel rim. The tire bead lifter provides bead positioning to the rim, thereby containing the foam in the cavity during curing so as to produce a uniform fill, without voids or spaces, within the tire and wheel cavity with the closed cell polyurethane foam.

SUMMARY OF THE INVENTION

It is a principal object of the present invention to provide a apparatus and process for filling a tire and wheel cavity with a closed cell polyurethane foam that is homogeneous throughout the filled tire and wheel cavity.

Another object of the present invention is to provide, by a selection of reactant component materials, during their reaction process, a nucleating gas that is entrained in the materials, and for injecting the mixed reactant materials and nucleating gas onto a tire that is mounted onto a wheel, filling the tire and wheel cavity, producing a closed cell polyurethane foam that is homogeneous throughout the filled cavity.

Another object of the present invention is to provide for filling the tire and wheel cavity through a fill hose whose end is fitted between the tire bead and wheel rim and is movable therearound to pass a measured volume of mixed reactant materials into the cavity, and includes a tire side wall lifting device for lifting the tire bead into engagement with the wheel rim after the measured volume of mixed reactant materials has been passed there, and while the reactant materials are reacting, filling the tire cavity with a homogeneous closed cell polyurethane foam material.

Still another object of the present invention is to provide apparatus and a method for its use for filling the cavity of a tire and wheel, that can be even a large tire and wheel combination, with a closed cell polyurethane foam that is homogeneous and void free throughout the filled cavity.

The present invention is in an apparatus and method for its use for filling the cavity of a tire and wheel with a closed cell polyurethane foam. The polyurethane foam is produced in a reaction of a selected isocyanate material with a polyol. The selected isocyanate and polyol, in their reaction, produce, as a component of the reaction, a nucleating gas that is entrained in the mixture. Which mixture continues to react as it is injected into the tire and wheel cavity. The reacting material is injected through a fill hose whose nozzle end is fitted between the tire bead and wheel rim and can, as needed, be moved to spaced locations around the bead and rim to uniformly fill the tire and wheel cavity.

For filling, the tire mounted on a wheel are positioned onto a platform such that the lower tire and wheel side are supported on the platform. The mixed polyurethane constituent materials and entrained nucleating gas are passed into a hose whose nozzle end is fitted across the tire bead and wheel rim into the tire and wheel cavity. During tire and wheel cavity fitting, the hose, as required, can be moved around the wheel rim, to insure a filling of the tire and wheel cavity. Thereafter the tire bead is lifted into engagement with the wheel rim. Bead lifting is provided by a mechanical tire bead lifting assembly. Specifically, for lifting the tire bead, the invention employs a pair of separate bead lifting lever arms that are each identically pivot mounted to a foot that is fixed, as with screws, into the tire side, proximate to the bead. Each bead lifting arm is pivot mounted though a frame that is secured to a wheel rim section containing lug holes, and extends upwardly through an open wheel hub and terminates in a hand engaging end. Each bead lifting arm frame end is secured to the wheel rim section containing lug holes to extend at right angles therefrom, through the open wheel hub, such that the bead lifting arm frames are parallel to one another and each is adjacent to an opposite side of the wheel hub.

With the lifting arms feet each mounted, as by screws, across from one another to the tire side, proximate to the tire bead, the polyurethane reactant materials are mixed and passed through a fill hose or tube whose nozzle end has been fitted between the tire bead and wheel rim. For fitting which hose, as required, the lifting lever arm hand engaging end can be lifted, moving the foot and connected tire slide wall downwardly at the tire bead widening the space between the tire bead and wheel rim, for facilitating fitting the fill hose end therebetween. Prior to mixing and injection of the polyurethane materials into the tire casing cavity, equal spaced radial vent holes are drilled into the tire side, and vent tubes are installed in each hole that provide for venting air from the tire during filling.

The volume of reactant polyurethane materials is calculated for the volume of the tire and wheel cavity, and, when that volume has been passed through the fill hose, the hose is removed and the lifting arms handle ends are moved downwardly, lifting the feet and attached tire side to pull the tire bead to the wheel rim. Which lifting arms are maintained in their tire side wall lifting attitudes until the reactant materials have fully reacted with one another, producing the closed cell polyurethane foam that has uniformly filled the tire casing and wheel cavity, and has urged the tire bead into permanent sealing engagement with the wheel rim. After curing, the vent tubes are removed as are the lifting arm feet, and the screw and drill holes are filled, completing the tire and wheel cavity filling.

DESCRIPTION OF THE DRAWINGS

The invention may take physical form in certain parts and arrangement of parts used to fill the tire and wheel cavity with the closed cell polyurethane foam and a preferred embodiment that will be described in detail in this specification and is illustrated in the accompanying drawings which form a part hereof.

DETAILED DESCRIPTION

Figure 1:
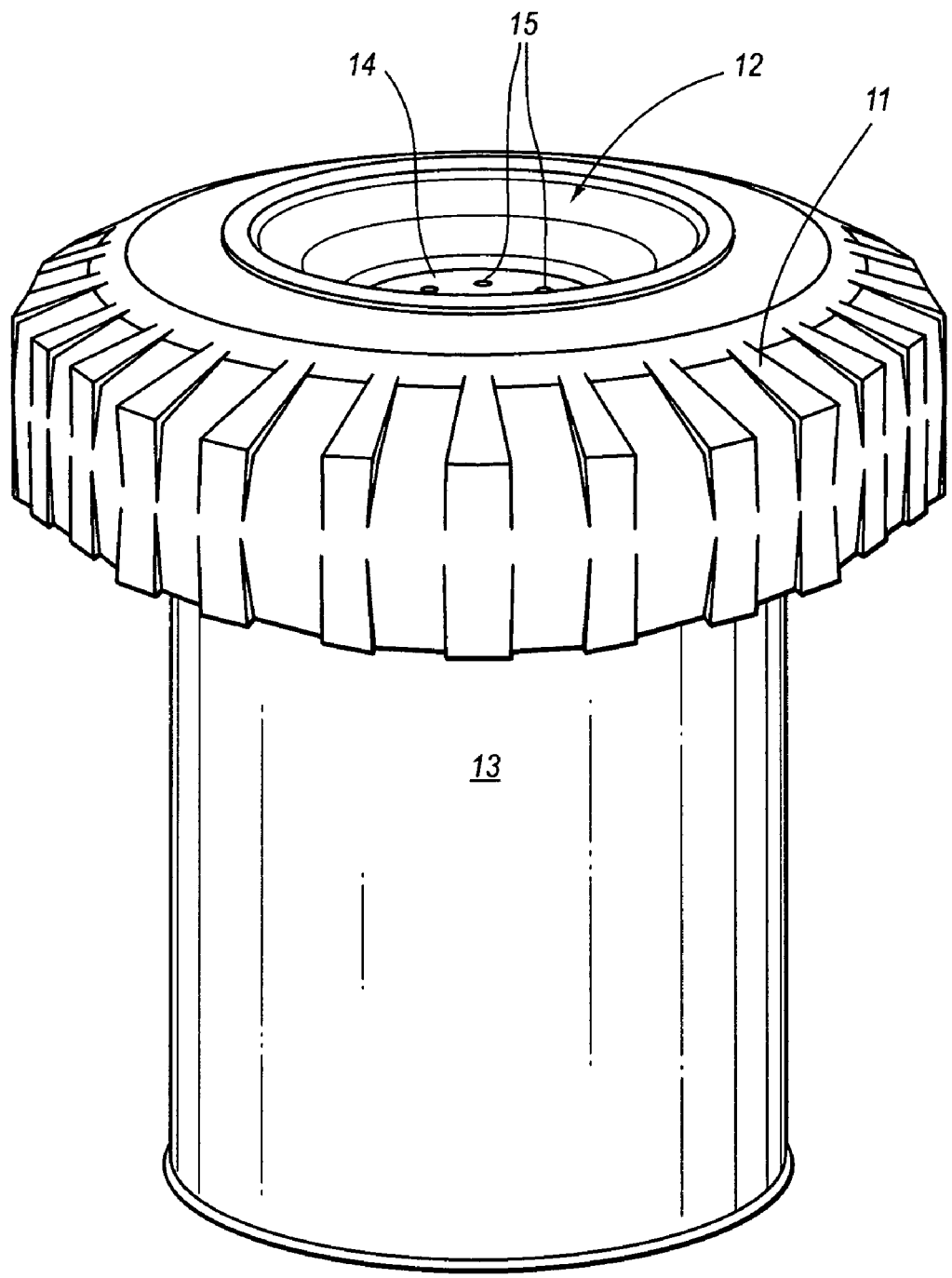
FIG. 1 is a side elevation perspective view of a stand whereon a tire and wheel have been positioned for filling the tire and wheel cavity with a closed cell polyurethane foam.
Figure 2:
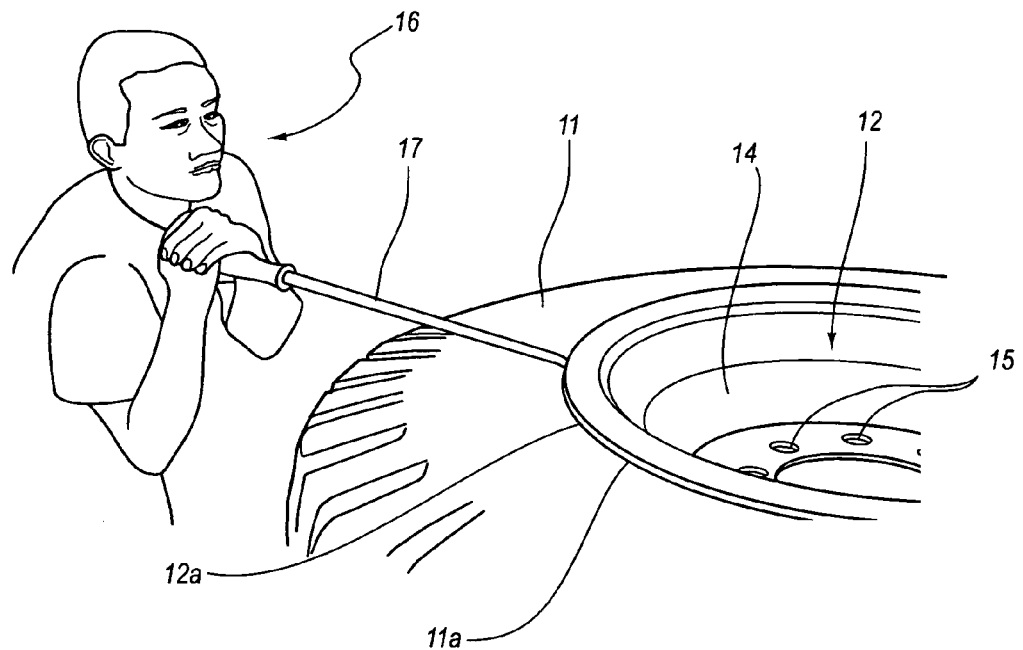
FIG. 2 shows a side elevation view of a section of a top side of the tire and wheel, showing a worker fitting a tire bead breaking tool between the tire bead and wheel rim for breaking the bead away from the wheel rim.

The invention is in an apparatus and method for its use for filling a tire and wheel cavity with a close cell polyurethane foam. FIG. 1 shows a tire 11 that has been mounted onto a wheel 12, and shows that assembly positioned on top of a stand 13, such that a wheel hub 14, that has radially spaced lug nut openings, is positioned above a top surface of the stand 13. In FIG. 2, the tire 11 and wheel 12, are maintained on the top surface of the stand 13, such that an operator 16 can manually fit a pry bar type tool 17 end between the tire 11 bead 11a and a rim 12a of the wheel 12 to pry the tire bead 11a away from the rim 12a, as shown in FIG. 3.

Figure 3:
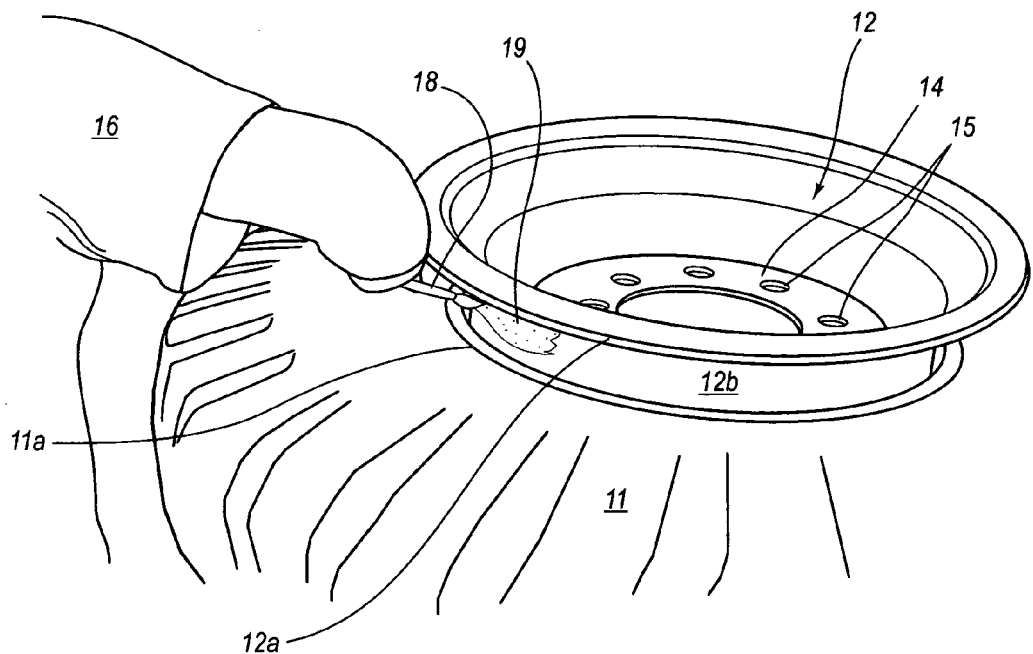
FIG. 3 is a view of the tire and wheel of FIG. 2, showing the worker as applying a mold release liquid onto the wheel hub below the rim for facilitating the movement of the tire bead up and down along the rim hub surface.
Figure 4:
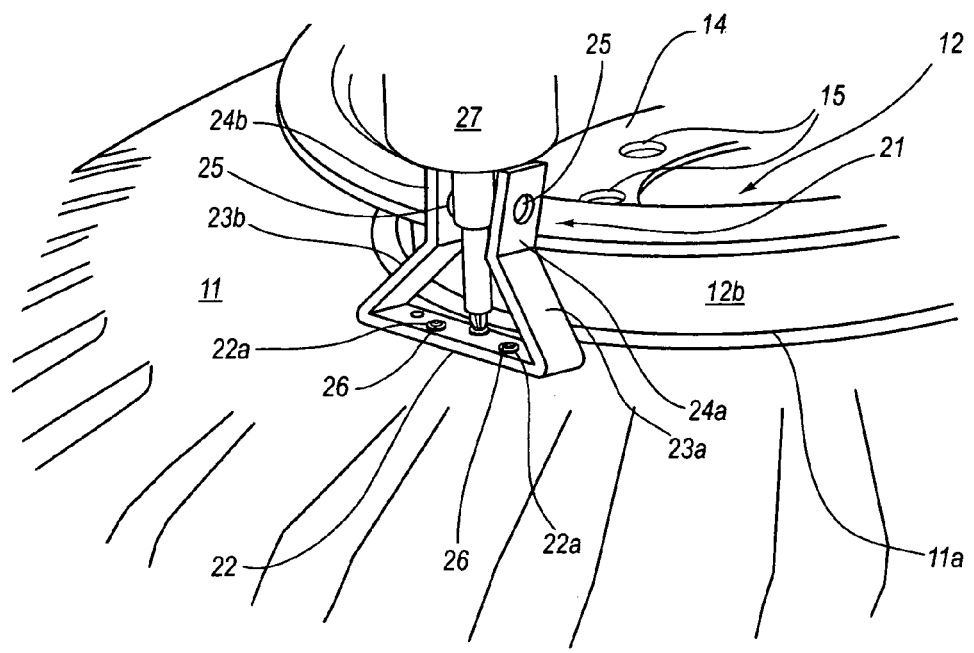
FIG. 4 is a view of the tire and wheel of FIG. 3, showing a foot of one of a pair of lifting arm assemblies that is being secured to the tire side wall, alongside the tire bead, and prior to attaching a lifting arm end thereto.

FIG. 3, shows the operator's hand holding a brush 18 that he is using to apply a mold release 19 to the wheel 12 hub 12b that is to facilitate travel of the bead 11a up and down along the wheel hub 12b. In FIG. 4, a bead lifter foot 21, that is shown as a flat narrow rectangular section and consists of a base 22, whose ends are bent upwardly into inwardly sloping sides 23a and 23b, and whose ends are bent outwardly forming parallel end tabs 24a and 24b wherethrough a pivot hole 25 is formed. The base includes holes spaced off-set holes 22a formed therethrough that are to receive screws 26 turned into the tire 11 side. Which screws 26 are preferably screws that have spaced deep threads, commonly called "grabber screws" that, when turned into the tire side, such as with an electric screw driver 29, shown in FIG. 5, that, provide excellent purchase, securely connecting the base 22 to the tire 11 side wall, proximate to the bead 11a.

Figure 5:
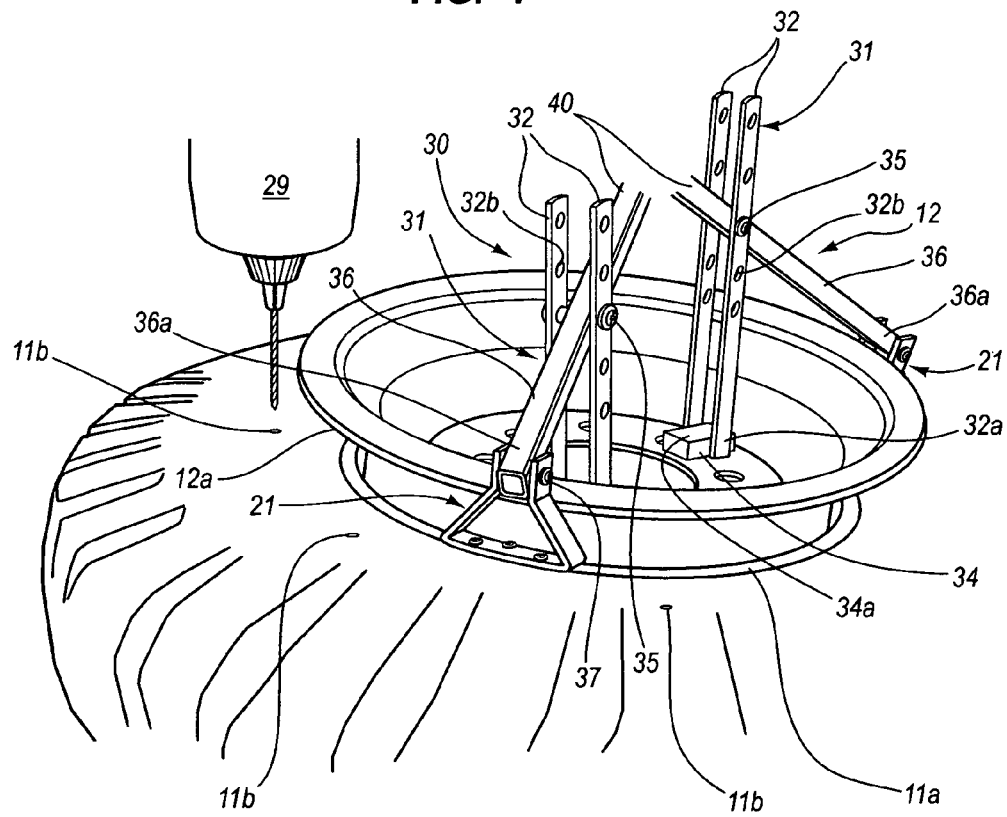
FIG. 5 is a view of the tire side wall of FIG. 4, additionally showing a drill being used to form equal spaced radial vent holes into the tire side wall, and showing the lifting arm end of one of the pair of spaced lifting arm assemblies pivotally mounted to the foot and showing the lifting arms as pivotally mounted to assembly frames that are mounted to extend upwardly, at right angles, from the wheel rim.

FIG. 5 shows the tire 11 and wheel 12 with a drill 29 positioned above the tire side wall that is shown as drilling equal spaced holes 11b therein, that are spaced apart at equal radial intervals around the side of the tire. Additionally, a pair of lifting arm assemblies 30 are shown extending upwardly, at right angles, from their mounting to wheel rim 14, at lug nut holes 15. Each lifting arm assembly 30 includes a lifting arm frame 31 that has opposing sides 32 that are each fixed at their bottom or base ends 32a to extend upwardly from opposite parallel surfaces of a rectangular block 34, extending perpendicular from the block 34 top surface 34a. The blocks 34 each include a fastener arrangement for connecting the block to the wheel rim, at wheel lug hole 15, that can be a threaded rod extending from the block bottom that is fitted through a lug hole 15 to receive a nut turned thereover, not shown. Or a like coupling arrangement for securely mounting each block 34 to the wheel rim 14 at a lug hole 15, can be similarly employed, within the scope of this disclosure.

The lifting arm frames 31 sides 32 each include equal spaced holes 32b that align. Selected aligned holes 32b are to receive pivots 35 that are fitted through aligned holes, and through a hole or holes formed through mid-sections of lifting arms 36, providing the pivot mounting. The pivot mountings of the lifting arms provides a fulcrum for lifting and lowering a lifting arm forward end 36a. Which lifting arm forward end 36a is pivotally coupled at pivot 37 to the bead lifter foot 21. The pivot 37 is fitted through the holes 25 that, as shown in FIG. 4, are formed through parallel end tabs 24a and 24b of the bead lifter foot 21. So arranged, an operator, not shown in FIG. 5, by pulling downwardly on handle ends 40 of lifting arms 36, shown best in FIG. 8 as arrows A, lifts the bead lifter foot 21 and connected tire side 11 so as to move the bead 11a into engagement with the rim 12a.

Figure 6:
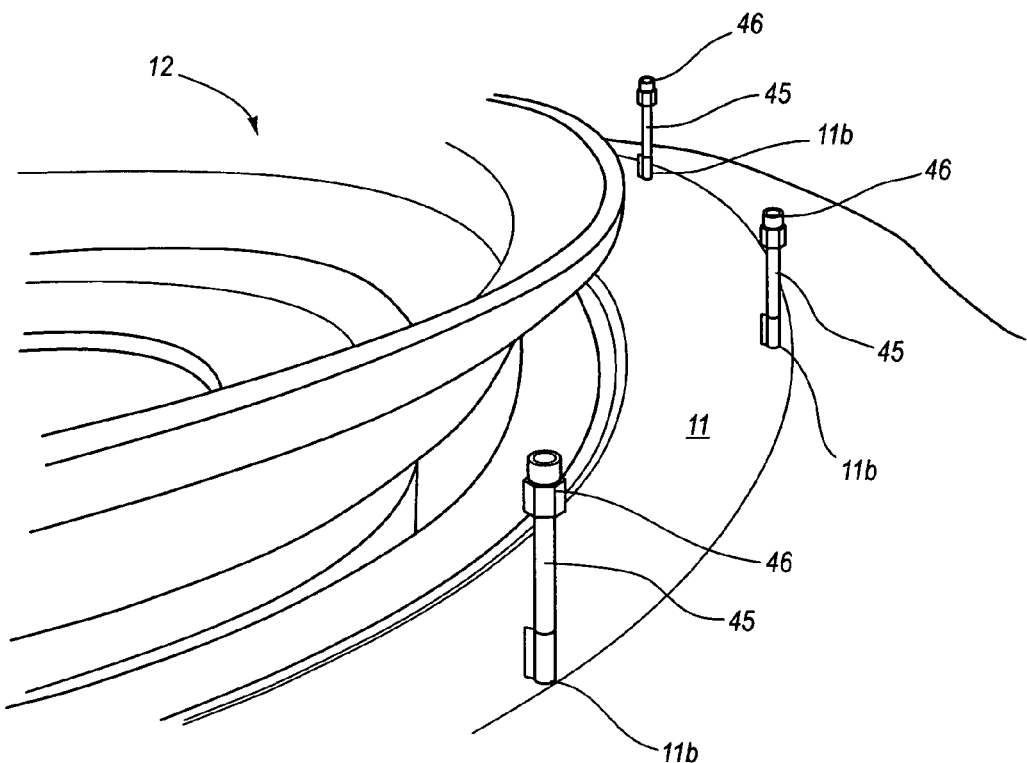
FIG. 6 is a side elevation perspective view of a section of the tire side wall wherein vent holes have been formed that have received vent tubes fitted into each vent hole.

FIG. 6 shows the tire 11 and wheel 12 of FIG. 5, with the radially spaced tire side wall holes 11b shown as having had ends of tubes 45 fitted therein, and showing the tubes top ends as including valves 46 fitted thereover. Which valves are provided to open the tubes 45 to vent air from within the tire during filling with polyurethane foam.

Figure 7:
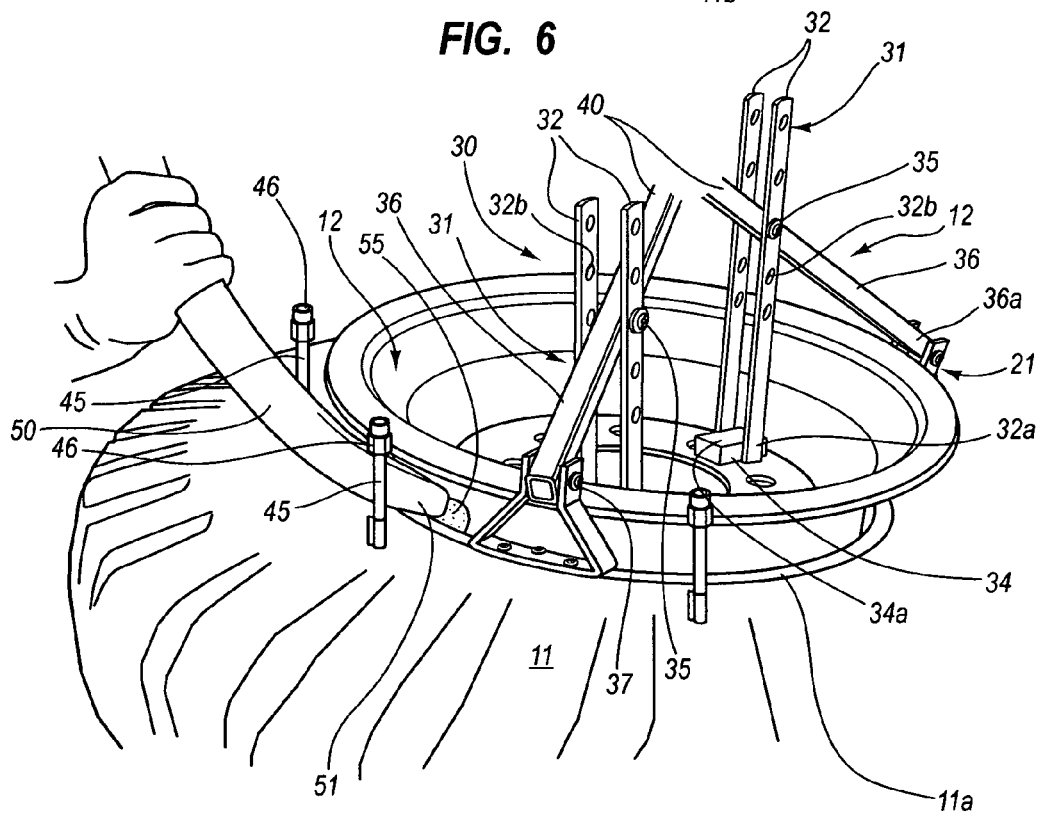
FIG. 7 is a view like that of FIG. 5, showing a nozzle end of a fill hose fitted between the tire bead and wheel rim, and passing a mixture of polyurethane materials therethrough.

FIG. 7 shows the tire 11 and wheel 12 of FIG. 5 with a hand of operator 16 of FIG. 2, shown holding a tire fill hose 50 whose end 51 has been fitted between the tire bead 11a and wheel rim 12a, dispensing the mixture 55 of polyurethane constituents into the tire and wheel cavity.

Figure 8:
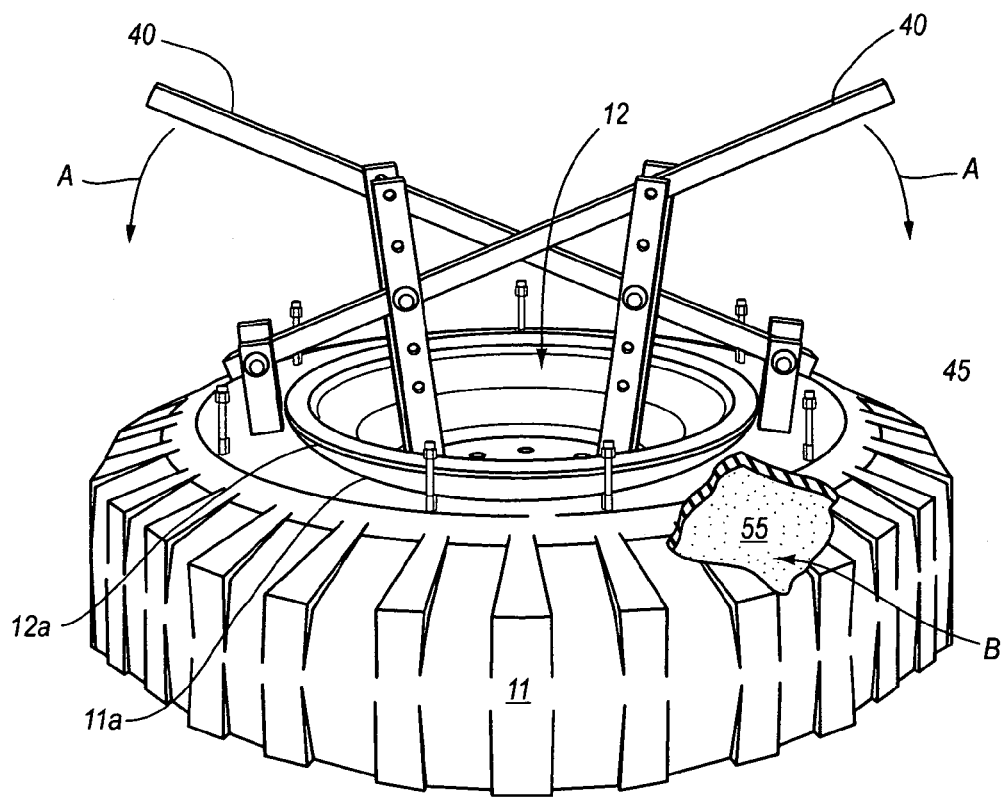
FIG. 8 shows a side elevation perspective view of the tire and wheel with the fill hose removed after passing the mixture of polyurethane reactant materials containing a nucleating gas therethrough, and before the lever arms are pulled downwardly, as shown by arrows A, for lifting the tire bead into engagement with the wheel rim.

FIG. 8 is a view like that of FIG. 7 only the tire fill hose 50 has been removed, and with the tire 11 bead 11a is about to be lifted into engagement with the wheel rim 12a by the downward movement of the lifting arms 36 ends 40, illustrated by arrows A. The filling of the tire 11 and wheel 12 cavity with the reacting closed cell polyurethane foam 55, that is shown as having cured within the cavity, through a removed tire side wall section B, provides a pressure that acts to lift the tire bead 11a into sealing engagement with the wheel rim 12a. During which tire and wheel cavity filling with the closed cell polyurethane material, air is vented through the tubes 45 and passes to atmosphere through the valves 46. As the air is vented from the tire and wheel cavity, the closed cell foam flows throughout the tire and wheel cavity, eliminating pockets and providing a homogeneous fill.

Figure 9:
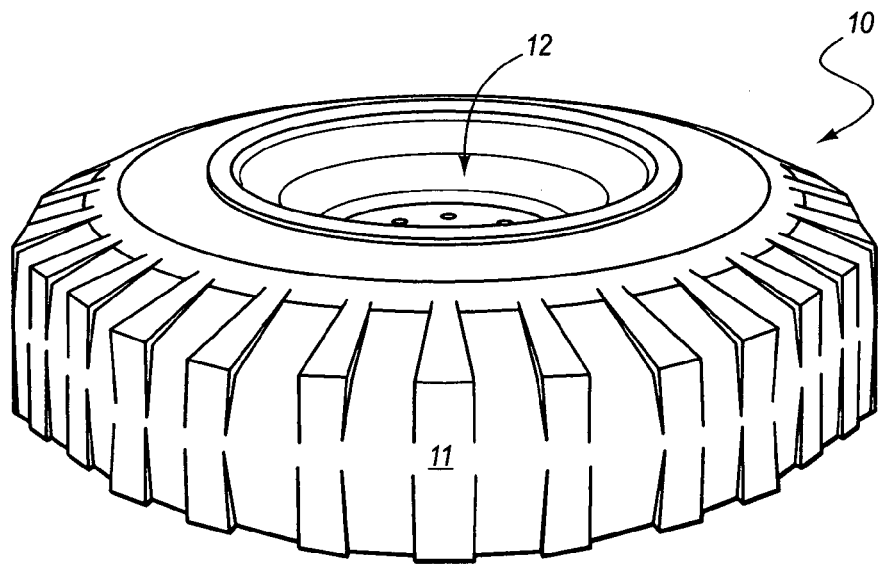
FIG. 9, is a view like that of FIG. 8 showing the tire and wheel cavity filled with the closed cell polyurethane foam material and after the removal of the lifting arms assemblies.

FIG. 9 shows the tire 11 and wheel 12 combination of FIG. 8, after its cavity has been filled with the closed cell polyurethane foam, after the vent tubes 45 and the pair of lifting arm assemblies 30 removed, with the holes as were drilled into the tire side wall that received the vent tubes 45 and the holes made by the screws 26 that mounted the lifting arm assemblies bead lifting feet 21 removed, and after the drill and screw holes have been filled, producing a finished filled tire and wheel 10 that is ready for mounting to a vehicle for use as a load bearing tire and wheel.

Figure 10:
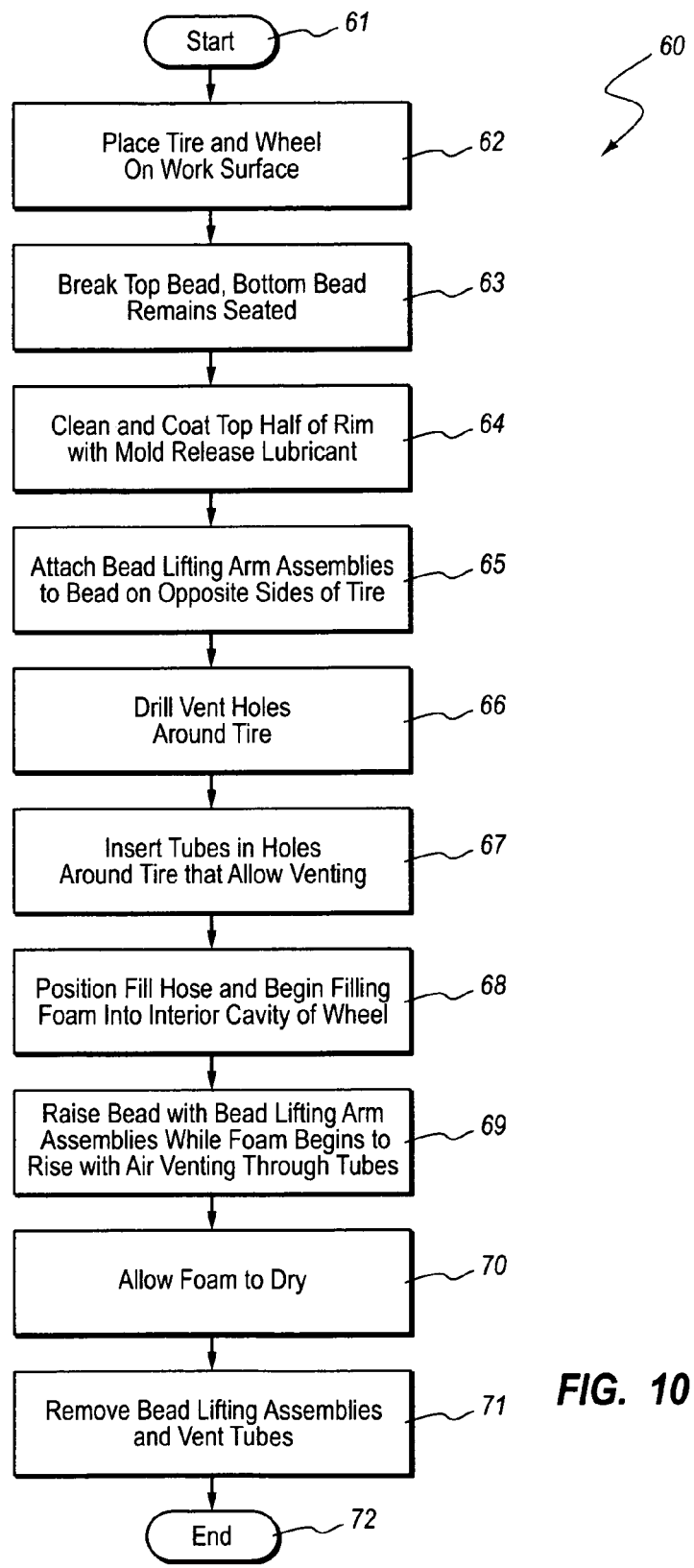
FIG. 10 is a block flow schematic showing the steps of the invention for filling a tire and wheel cavity with a closed cell polyurethane foam.

FIG. 10 is a block flow schematic 60 illustrating the steps involved in a practice of the process of the invention for filling a tire and wheel cavity with a closed cell polyurethane foam. The process is started, bock 61, by, with as set out in block 62, a side of the tire and wheel is placed onto a work surface, that is shown in FIG. 1 as a stand 13. Block 63 calls for the tire top bead being broken away from the wheel rim, with the tire bottom bead remaining seated, as shown in FIG. 2. Block 64 calls for cleaning and coating the wheel rim with a mold release lubricant, as shown in FIG. 3. Block 65 calls for attaching the bead lifting arm assemblies to opposite sides of the tire, proximate to the tire bead, as shown in FIG. 4. Block 66 calls for drilling tube holes at radially spaced intervals around the tire side wall, as shown in FIG. 5, and block 67 calls for inserting the tubes into the drilled holes to provide for venting air from within the cavity of the tire and wheel, as shown in FIG. 6. Block 68 calls for positioning the fill hose between the tire bead and wheel rim, and filling the tire and wheel cavity, as shown in FIG. 7. Block 69 calls for raising the tire bead into engagement with the wheel rim after flow of the polyurethane foam has been cut off, and the fill hose has been removed, with the mixture of polyurethane constituents continuing to react, filling the tire and wheel cavity with the closed cell foam, as shown in FIG. 8. Block 70 calls for allowing for drying of the closed cell polyurethane foam. Whereafter, block 71 calls for removal of the bead lifting assemblies and vent tubes and includes filling screw holes and drilled holes as were formed into the tire side wall, producing the polyurethane closed cell foam filled tire of FIG. 9.

In practice, earlier tire and wheel filling devices and methods have filled the tire and wheel cavity through the tire valve stem or through a hole cut into the tire to remove the valve stem, while maintaining the tire bead sealed to the wheel rim. Such systems, as they fill at the valve stem, have a difficult time passing a sufficient volume of the reacting materials into the tire and wheel cavity to uniformly fill the cavity before the material set up. Accordingly, such earlier systems have been limited to use with tires and wheels for light duty vehicles, even for such small tires and wheels, the foam filling has often failed to be homogeneous throughout the tire and wheel cavity, providing a foam filled tire that has a short life as the flexure into the fill void or voids creates heat that, over time, destroys the filled tire. Whereas, the invention, by providing for mechanically lifting the bead into engagement with the wheel rim after filling, and while the constituents are still reacting, a uniform filling of even large tires. According, the invention can be used to fill even very large tire and wheel combinations.

While a preferred embodiment of our invention in a method and apparatus for filling a tire and wheel assembly with a closed cell foam has been shown and described herein, it should be understood that variations and changes are possible without departing from the subject matter coming within the scope of the following claims, and a reasonable equivalency thereof, which claims we regard as our invention.

We claim:

1. Apparatus for filling a tire and wheel combination with a closed cell foam comprising, a stand means having a flat top surface for receiving a tire and wheel side laid thereon; a means for separating a tire bead of said tire from a rim of said wheel; at least one tire bead lifting assembly that includes a fixed base for anchoring an end of a lifting arm frame whereto a bead lifting arm is pivot mounted such that a raising of one lifting arm end lowers an opposite lifting arm end that is aligned over said tire top surface, proximate to said tire bead, and said opposite lifting arm end includes a foot that is connected thereto by a pivot, and said foot includes means for fastening it to said tire top surface, next to said tire bead; means for forming radially spaced holes into said tire top surface to each receive a vent tube fitted therein; and a fill hose for insertion between said tire side wall bead and said wheel rim for passing a flow of a mixture of polyurethane constituents into a cavity of said tire and wheel.

2. The apparatus as recited in claim 1, wherein the bead lifting assembly fixed base includes a means for mounting each said fixed base onto a wheel hub flange, at spaced apart lug nut holes, and where the selected lug nut openings are located on opposite sides of said wheel hub.

3. The apparatus as recited in claim 2, wherein the bead lifting assembly includes a pair of like straight rigid bead lifting arms that are each pivotally mounted to a mid-section of each of a pair of straight lifting arm frames that connect, to extend at right angles from, the fixed bases, so as to be within and parallel to the wheel hub surface, and each bead lifting arm has a hand engaging end and is pivot mounted, on its opposite end to the bead lifting foot that is attached, along a flat lower section, opposite to its pivot mounting, to said bead lifting arm opposite end, and said bead lifting foot is attached to said tire top surface, alongside said tire bead.

4. The apparatus as recited in claim 3, wherein the bead lifting foot is formed from metal and includes a straight bottom section, upturned sides and parallel spaced ends that have holes formed therethrough that align to receive a pivot pin fitted therethrough and through the bead lifting arm opposite end, and said straight bottom section of said foot includes spaced holes that receive screws turned therethrough and into the tire top surface, joining said bead lifting foot and tire top surface.

5. The apparatus as recited in claim 1, wherein the vent tubes include valves fitted over each vent tube open end and are for controlling passage of air therethrough.

* * * * *